United States Patent [19]

Gottlieb

[11] 4,433,810
[45] Feb. 28, 1984

[54] HOT WATER HEATING SYSTEM

[75] Inventor: Saul Gottlieb, Wantagh, N.Y.

[73] Assignee: Simon Gottlieb, Brooklyn, N.Y.

[21] Appl. No.: 25,938

[22] Filed: Apr. 2, 1979

Related U.S. Application Data

[63] Continuation-in-part of Ser. No. 820,296, Jul. 29, 1977.

[51] Int. Cl.³ .......................... F24D 3/02; F24D 5/10
[52] U.S. Cl. .................................. 237/8 R; 236/9 A; 236/91 F; 237/63
[58] Field of Search ............... 236/91 F, 9 A; 165/22; 237/63, 8 R

[56] References Cited

U.S. PATENT DOCUMENTS 2,621,856 12/1952 Smith .................................. 236/9 A
3,421,691 1/1969 Forbes ........................... 237/8 R X

*Primary Examiner*—William E. Wayner
*Attorney, Agent, or Firm*—Bauer & Amer

[57] ABSTRACT

In contrast to reducing the temperature of the heat exchange medium or water so as to conserve on fuel consumption in response to an externally located thermostat or the like upon the occurence of favorable ambient weather conditions, said reduction in accordance with the present invention is, instead, made based on nominal operation of the pump circulating said heat exchange water. The within control that is exercised over the temperature of the heat exchange water to take advantage of mild ambient weather conditions is thus not dependent upon the specific location selected for the thermostat, which location may have more sun and less wind than the spaces or zones being heated. In this and other ways, as hereinafter described, the supervision of the pump provides an accurate and effective control for a hot water heating system that significantly contributes to savings in fuel consumption, but without adversely affecting heating comfort.

3 Claims, 4 Drawing Figures

HOT WATER HEATING SYSTEM

This application is a continuation-in-part of U.S. patent application Ser. No. 820,296, filed July 29, 1977.

The present invention relates to an improved hot water heating system for a commercial dwelling or the like, and more particularly to an improved control for regulating the temperature of the hot water used in said system in accordance with prevailing ambient weather conditions, with the object of saving on fuel consumption when the weather is mild enough to warrant operating the system with a reduced temperature heat exchange medium.

As already recognized, as for example in the hot water system control described in prior U.S. Pat. No. 2,519,266, logic dictates the use of lower temperature water in milder ambient weather than that used, or required, under colder and more severe weather conditions. That is, the "hotter" heat exchange medium may more quickly heat the dwelling spaces or zones, but it is wasteful of fuel to maintain the temperature thereof at a higher level than is absolutely necessary. It is therefore proposed in the referred to patent, as well as elsewhere in the literature, to lower the boiler operating temperature whenever mild weather conditions are experienced that might warrant such a change. To achieve this objective, use is therefore made in the prior art of an externally-positioned thermostat which causes a reduction in the boiler operature temperature in accordance with the ambient weather conditions in immediate surrounding relation to the thermostat. While generally effective, these prior art weather-responsive controls have serious shortcomings. Among these shortcomings is the fact that the specific location for the thermostat assumes too much importance. If the sun happens to impinge on the thermostat at its selected location, or if at said location it is blocked from the wind, these factors may cause a lowering in the operating temperature level in the hot water that is not appropriate for the zones requiring heating, because said zones may be experiencing less favorable ambient weather conditions. Also, the weather insulation materials, such as may be used for the zones are known to differ considerably in their effectiveness. Thus, in one dwelling, effective insulation for the space or zones requiring heating may dictate a significant decrease in the operating temperature of the hot water for any given conditions of ambient weather as sensed by the thermostat than would be in the case if the spaces or zones were poorly insulated.

Broadly, it is an object of the present invention to provide an improved weather-responsive control for a hot water system overcoming the foregoing and other shortcomings of the prior art. Specifically, it is an object to embody in the system a weather-responsive control, but to nevertheless continue to have said system responsive to the temperature as sensed by the thermostats in the zones being serviced by the system and, in this way, have assurance that the control will not undermine the comfort control function that is provided by the zone thermostats. As will be explained in detail subsequently, underlying the present invention is the recognition that the zones being serviced are themselves responsive to changing ambient weather conditions in that there is occurring continuously heat exchange between these zones and prevailing ambient weather conditions. Thus, if the prevailing weather conditions are favorable in terms of the amount of sunlight, absence of wind, etc., which affect the temperature within these zones, this fact can, and is used effectively, to provide substantial fuel savings in the operation of the hot water heating system.

An improved weather-responsive control for a hot water heating system demonstrating objects and advantages of the present invention is one utilized for plural delineated zones to be heated so located as to be affected by changing ambient weather conditions, and wherein there is a hot water circulating system operatively arranged in heating relation to said delineated zones, said hot water circulating system including at least one hot water pumping means for circulating said hot water and having thermostats in said delineated zones connected in controlling relation to said pumping means for providing operation of said pumping means for a selected duration of time in accordance with the temperature in said delineated zones as sensed by said thermostats. There is, of course, also provided a boiler operatively arranged in heating relation to said circulating hot water that is effective to maintain the temperature thereof at a selected temperature level. In cooperating relation to the foregoing, the within invention contemplates the use of control means operatively connected in controlling relation to both said pumping means and said boiler effective to provide selected levels of temperature operation of said boiler corresponding to selected durations of operation of said pumping means, whereby nominal operation of said pumping means indicative of the use of hot water at an excessive temperature for given ambient weather conditions as sensed by said thermostats in said delineated zones is modified by corresponding modification of said boiler operating temperature. This reduction in the temperature of the circulated water increases the time required for its circulation in order for it to achieve its heat exchange function with the zones being serviced, and thus there is ultimately a balance or compatibility achieved between the pumping means duration of operation and the boiler operating temperature.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

CONVENTIONAL HOT WATER HEATING SYSTEM

As will be explained in detail subsequently, the present invention is concerned with improvements to a conventional hot water heating system that enable the temperature of the hot water being used therein to be effectively functionally related to the ambient weather conditions in which the heating system is being used. Thus, assuming during a conventional use of the heating system to heat a dwelling house that there occurs a favorable change in prevailing weather conditions, i.e., from extremely cold to mild temperatures, it is only logical that there be a reduction in the temperature of the hot water being circulated through the system so as to take advantage of this favorable change in the ambient weather conditions. That is, stated in terms of fuel conservation, it is only logical to use a heating medium at a lower temperature on a "mild" day, and thus take advantage of this favorable weather, than to needlessly consume fuel by heating the heat exchange medium to an excessively high temperature as would be used and would be required under colder and more severe weather conditions. While the logic of adjusting the temperature of the heating medium or the hot water in a typical and conventional hot water heating system in accordance with changing ambient weather conditions, particularly when these changes are favorable, has heretofore been recognized, prior to the present invention this objective has not been able to be achieved in an effective manner.

Figure 1:
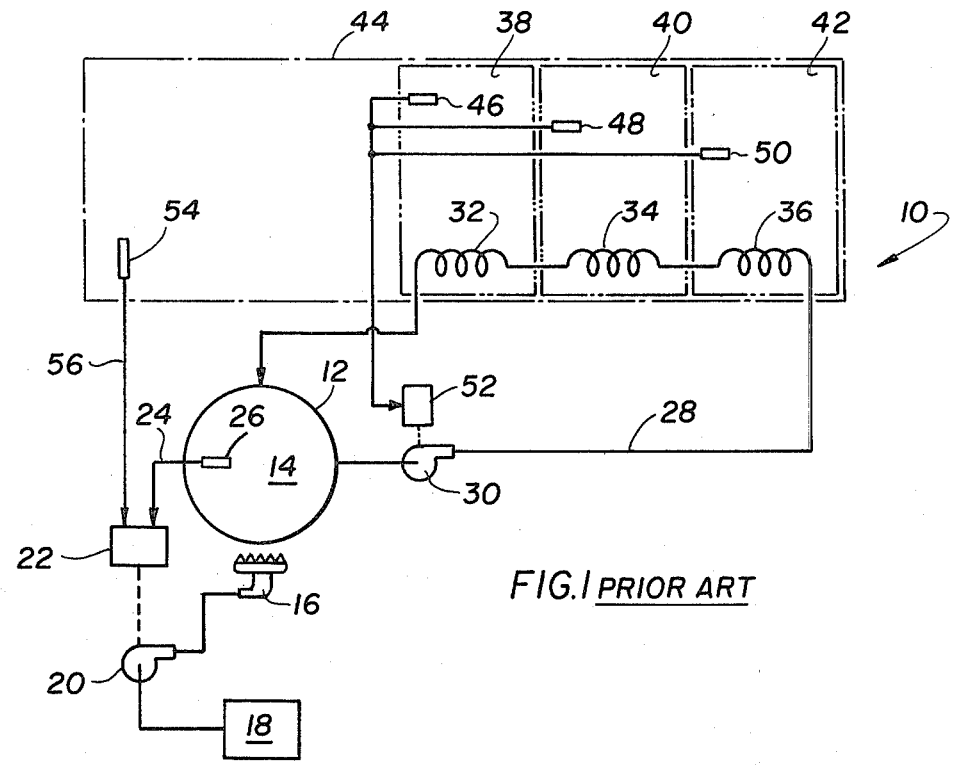
FIG. 1 is a diagrammatic view of a conventional hot water heating system in which the temperature of the hot water used therein is controlled in accordance with changing ambient weather conditions by presently known prior art techniques.

To facilitate an understanding of how the improvements of the present invention achieve effective correlation between the temperature of the circulating hot water and prevailing ambient weather conditions, reference should first be made to FIG. 1 which diagrammatically illustrates a conventional hot water heating system. This system, generally designated 10, includes a boiler 12 in which a volume of hot water 14, which serves as a heat exchange medium for the system 10, is heated to a selected temperature by a burner 16 appropriately supplied with oil or other such fuel from a storage tank 18 by pump 20. That is, as generally understood, connected in controlling relation to the pump 20 is a motor 22 which, in turn, has connected in controlling relation to it a thermostat 26. Said temperature-sensitive device or thermostat 26 senses the operating temperature level of the heated water 14 and controls the operation of the motor 22 via the operative connection 24. In a typical hot water heating system 10, it would not be uncommon for the starting temperature of the heating water 14 to be at approximately 200 degrees Fahrenheit, and for thermostat 26 to therefore cause operation of motor 22 and pump 20 so as to supply fuel to the burner 16 so as to maintain the temperature of the heating water 14 at said 200 degrees Fahrenheit.

Operatively associated with the boiler 12 is a closed loop conduit 28 through which the heated water is circulated to spaces or zones in the dwelling house that are required to be heated. Thus, as understood, connected in the conduit 28 is a circulating pump 30 and plural heat exchange coils, as exemplified by the coils 32, 34 and 36, each advantageously located in heat exchange relation to a delineated space or zone 38, 40 and 42, respectively. These zones, of course, will be understood to be rooms or areas in the dwelling house serviced by the hot water system 10. The area enclosed by the rectangle identified by the reference numeral 44 is intended to signify the heat exchange relation that exists between the zones 38, 40 and 42 and the surrounding ambient weather conditions. Thus, the prevailing temperature within the zones 38, 40 and 42 is necessarily affected by the heat exchange that occurs into and out of these zones as a result of the prevailing ambient weather conditions 44. This, of course, is in addition to the increase in temperature that occurs through heat exchange using the coils 32, 34 and 36 in these zones.

Completing a typical conventional hot water heating system 10 are temperature-sensitive devices or thermostats 46, 48 and 50 which are respectively located in each zone. These devices are appropriately connected in controlling relation to a motor 52 for the circulating pump 30. As understood, motor 52 is operated, individually and collectively, by the thermostats 46, 48 and 50, wherein operation of the pump 30 as caused by motor 52 results in the circulation of hot water through the coils 32, 34 and 36 whenever the zones associated with these coils require additional heat for the comfort of the individuals located within these zones.

Prior Art Ambient Weather Controls

As exemplified by U.S. Pat. No. 2,519,266, there is available for use with a hot water heating system 10, as just described, a control for operating such system so as to appropriately take account of changing ambient weather conditions. Thus, as shown in FIG. 1, and as is well understood as well as being described in the referred to patent, there is operatively associated with the system 10 a temperature-sensitive device or thermostat 54 which is located externally of the dwelling, or in some other such position so as to be affected by ambient weather conditions 44. This externally-located thermostat 54 has, as understood, an appropriate operative connection 56 with the fuel pump motor 22 which provides a control in overriding relation to that of the boiler thermostat 26. That is, thermostat 54 effectively modifies the control exercised over the motor 22 by the thermostat 26 so that if the ambient weather conditions are mild, this is taken into account in the operation of the motor 22 which, of course, operates the pump 20 and supplies fuel to the burner 16.

In summary, assuming that burner 16 is supplied with fuel by the operation of pump 20 to, in turn, have the hot water of the system 10 at an initial temperature of 200 degrees Fahrenheit as sensed by the thermostat 26, upon the occurence of favorable ambient weather conditions as sensed by the thermostat 54, the operation of motor 22 which powers pump 20 is modified so that the fuel supplied to the burner 16 is decreased to cause a corresponding decrease in the operating temperature of the water 14 of perhaps 10 degrees, or to a level of 190 degrees Fahrenheit. Assuming that the weather becomes even milder, the overriding control effect of the thermostat 54 may cause a further 10 degree decrease in the operating temperature of the hot water 14 to a level of 180 degrees Fahrenheit, and so on. As a result, the degrees of reduction in the temperature of the hot water 14 at which boiler 12 operates during favorable ambient weather conditions produces significant fuel savings for the system 10.

While control of the hot water system 10 in accordance with changing ambient conditions can theoretically, as just described, result in significant savings in fuel, prior art techniques for achieving this objective are not effective, and this probably accounts for the failure of most hot water systems not being responsive to this type of control. Taking, for example, the prior art use of an external thermostat 54, the shortcomings of this technique are significant. Among these shortcomings is the fact that the specific location for the thermostat 54 assumes too much importance. If the sun happens to impinge on the thermostat at its selected location, or if at said location it is blocked from the wind, these factors may cause a lowering in the operating temperature level in the hot water 14 that is not appropriate for the zones 38, 40 and 42 because said zones are experiencing less favorable ambient weather conditions. Also, the weather insulation materials, such as may be used for the zone 38, 40 and 42, are known to differ considerably in their effectiveness. Thus, in one dwelling, effective insulation for the space requiring heating may dictate a significant decrease in the operating temperature of the hot water 14 for any given conditions of ambient weather as sensed by the thermostat 54 than would be the case if the same zone was poorly insulated. Thus, while it is desirable that a hot water heating system be operated in accordance with changing ambient weather conditions so that if the change is favorable, i.e., it becomes sunny and mild, there can be significant savings in fuel in operating the system, the achieving of this objective cannot be at the expense of the comfort to the individuals within the dwelling zones 38, 40 and 42. To the extent, therefore, that the control that is exercised over the system 10 in accordance with the present invention effectively avoids the shortcomings of the prior art, and more particularly provides significant fuel savings while maintaining the comfort of the heated zones or areas 38, 40 and 42, said control, as will now be described, is a significant contribution to this technology.

INVENTIVE HOT WATER HEATING CONTROL

Figure 2:
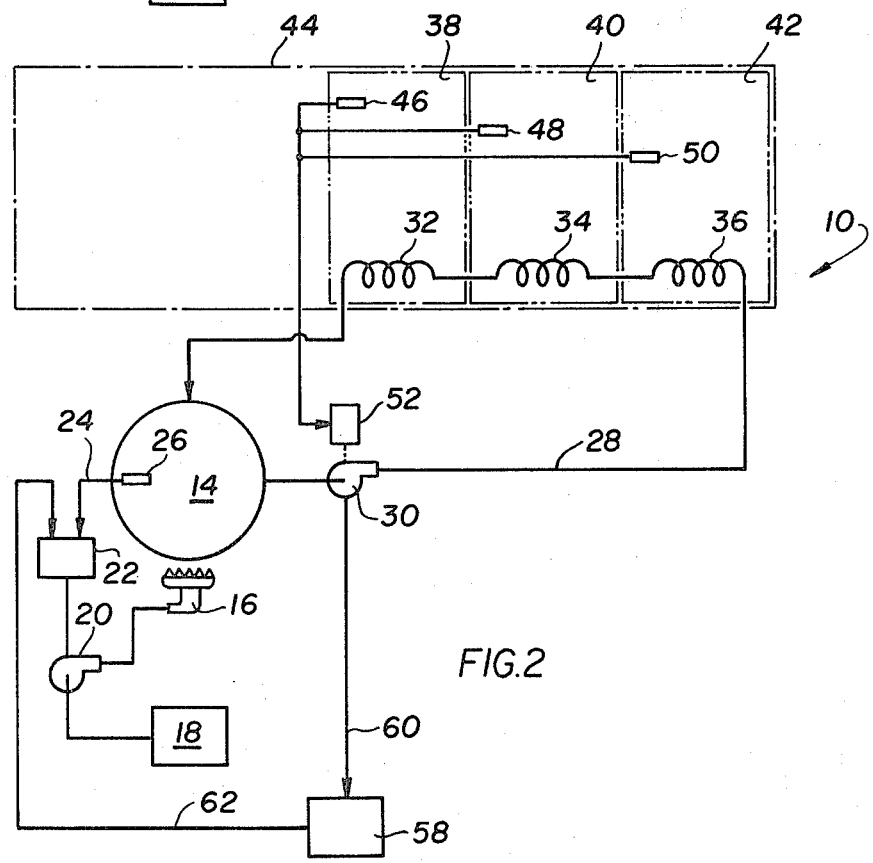
FIG. 2 is a diagrammatic view containing much of the same content as FIG. 1, with the important exception that it illustrates the improved technique according to the present invention of regulating the temperature of the hot water in accordance with changing ambient weather conditions.

Reference should now be made to FIG. 2 which illustrates a control for a hot water heating system 10 that appropriately reflects favorable changes in ambient weather conditions 44 without any adverse effect on the operation of the system 10 as far as providing heating comfort in the delineated areas or zones 38, 40 and 42. For brevity sake, the description of the components of system 10 already provided in connection with FIG. 1 will not be repeated, and to signify similarity in the construction and mode of operation of each such component, the same will be identified by the same reference numeral in FIG. 2 as was used in connection therewith in FIG. 1. By examination of FIGS. 1 and 2, it should be noted that in the arrangement of FIG. 2 there has been eliminated the external thermostat 54 and, of course, its operative overriding controlling connection 56 to the fuel pump motor 22. The control substituted for this prior art control 54, 56 represents the within inventive contribution.

More particularly, underlying the present invention is the recognition that the manner in which the system 10 operates in response to changing ambient weather conditions affords the best and most effective basis on which to modify the operating temperature of the hot water 14, so that in response to favorable changes in the ambient weather conditions there can be achieved significant savings in fuel consumption. Stated another way, the zones 38, 40 and 42 are, of course, responsive to changing ambient weather conditions in that there is occurring continuously heat exchange between these zones and prevailing ambient weather conditions 44. Thus, if weather conditions 44 are favorable in terms of the amount of sunlight, absence of wind, etc. which affect the temperature within the zones 38, 40 and 42, this is sensed individually and collectively by the thermostats 46, 48 and 50, and this results in a controlling influence on the motor 52 which provides that motor with what can be characterized as "nominal" operation. That is, because of the favorable ambient weather conditions, motor 52 operates infrequently because pumping operation of pump 30 to circulate the hot water 14 to zones 38, 40 and 42 is not required for the heat exchange function in these zones.

An important aspect of the present invention is therefore the recognition that the amount of operation and non-operation of the pump 30 is an accurate and effective basis upon which to regulate the temperature level of the hot water 14 being used in the system 10 in accordance with changing ambient weather conditions. More particularly, the present invention contemplates that during a selected time interval, such as for example an hour, that the amount of operation and non-operation of the pump 30 will be appropriately monitored, by time clocks or the like, and that if the pump 30 is primarily non-operational during this time period, that this signifies that for the prevailing ambient weather conditions the temperature level of the hot water 14 being circulated through the system is excessively high. Stated another way, the hot water 14 at the "excessive" temperature is effective under the prevailing weather condition when circulated only for a minor portion of a selected time interval of providing a corresponding "high" temperature in the zones 38, 40 and 42 so that the respective thermostats 46, 48 and 50 in these zones are not required to call for, or demand, any further operation of the water circulating motor and pump 52, 30. While this minimizes wear of the pump 30, it needlessly wastes fuel by requiring boiler operation at too high a temperature. It is thus logical to conclude that the system 10 can, without adverse effect on comfort, operate with the heat exchange water 14 at a lower temperature. Thus, the present invention further contemplates that in instances where the pump 30 has only "nominal" operation, that this be the basis of exerting an overriding control over the operation of the boiler 12 so that the operating temperature level thereof is appropriately lowered to provide a corresponding savings in fuel. As in the case of the prior art control of FIG. 1, therefore, it is contemplated that if it is assumed that the starting temperature of the water 14 is approximately 200 degrees Fahrenheit, that in response to sunny and mild ambient weather conditions, that an appropriate control be exercised over the fuel pump motor 22 so that such pump will operate to supply fuel which will maintain the water 14 at a reduced temperature of 10 degrees, and thus at a temperature of 190 degrees Fahrenheit. If the favorable ambient weather conditions continue, or become even more favorable, the operating temperature can be reduced a further 10 degrees to 180 degrees Fahrenheit, and so on. In this manner, the control contemplated by the present invention achieves significant savings in fuel consumption.

When the operating temperature of the hot water 14 being used in the system 10 is lowered this, of course, requires a greater duration of circulation of this heat exchange medium in relation to the zones 38, 40 and 42 in order to maintain a temperature level in these zones which "feels" comfortable to the occupants thereof. This consequence is automatically provided individually and collectively by the thermostats 46, 48 and 50 located in these zones which, in a well understood manner, cause the operation of the motor and pump 52, 30 for that duration of time necessary to enable the reduced temperature heat exchange medium 14 to achieve its required heat exchange into the zones 38, 40 and 42. Thus, a consequence of the reduction in the temperature of the heat exchange medium 14 is that pump 30 will operate for a longer period of time than prior to the temperature reduction. Thus, in a selected one-hour time period, the reduction in the temperature of the heat exchange medium 14 eventually will result in a desirable greater period of operation, than period of non-operation of the pump 30. When this over balance of pump operation is achieved, no further reduction is required in the temperature in the heat exchange medium 14, and none therefore occurs, since heating is being achieved by operation of the pump, rather than use of an excessively hot heat exchange medium.

With the above understanding of the concept underlying the operation of the within improved hot water system control, it should be readily apparent to those well versed in the art that there are many ways of implementing this control, and that the important and significant aspect distinguishing the same over prior art controls, as exemplified by the control of FIG. 1, is that the boiler operating temperature is controlled as a function of the operation of the motor and pump 52,30, rather than as a function of some externally located thermostat 54 or the like. This distinguishing aspect of the within control is diagrammatically illustrated in FIG. 2, wherein there is illustrated a control unit 58 having an operative, supervising or monitoring connection 60 to the pump 30, as a result of which it is capable of determining in a one-hour period or other such selected period, the amount of operation and non-operation there is of the pump 30.

Control unit 58 also has an operative connection 62, in overriding relation to the boiler thermostat 26, to the fuel pump motor 22 which effectively causes operation of the motor and pump combination 22, 20, in terms of fuel supply to the burner 16, which results in one or more appropriate temperature reductions in the heat exchange medium 14 being prepared in the boiler 12. In this sense, therefore, control unit 58 functions in a manner similar to the external thermostat 54 of FIG. 1, but with the important exception that control unit 58 is responsive to the extent of operation and non-operation of the circulating pump 30, whereas the thermostat 54 of FIG. 1 is responsive to the specific ambient weather conditions in which it was located.

For completeness' sake, an appropriate mechanism for controlling the temperature setting of the boiler aquastat 26 will now be described with particular reference to FIGS. 3 and 4. More particularly, control unit 58 having the function as previously described may be a well known electronic speed switch capable of being purchased from any one of a number of sources. One appropriate source is Cynchro-Start Products, Inc. of Skokie, Ill. As illustrated in FIG. 4, such switch is operatively associated, via operative connection 60, with a shaft 62 for the motor 64 operating the pump 30, and is designed to move from an open to a closed position when the shaft rotates. One common use of such an electronic speed switch is to prevent movement in a bus or other such vehicle when the doors thereof are opened.

Figure 3:
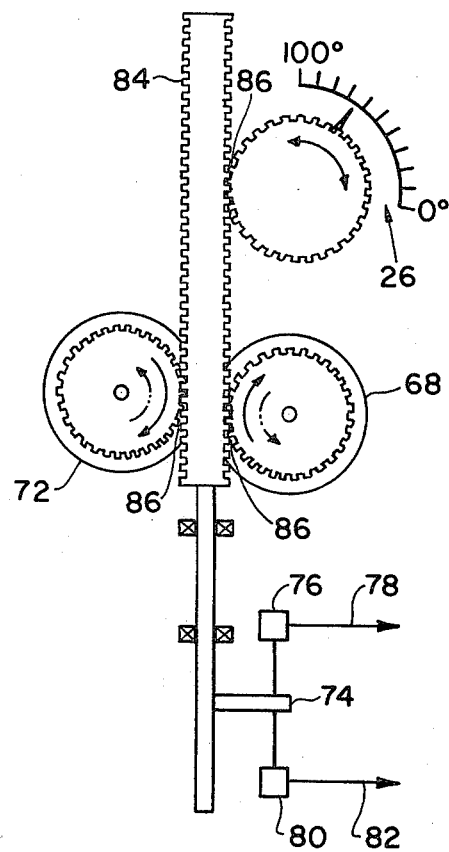
FIG. 3 is a diagrammatic view of suitable means of making adjustments in the setting of the boiler aquastat.
Figure 4:
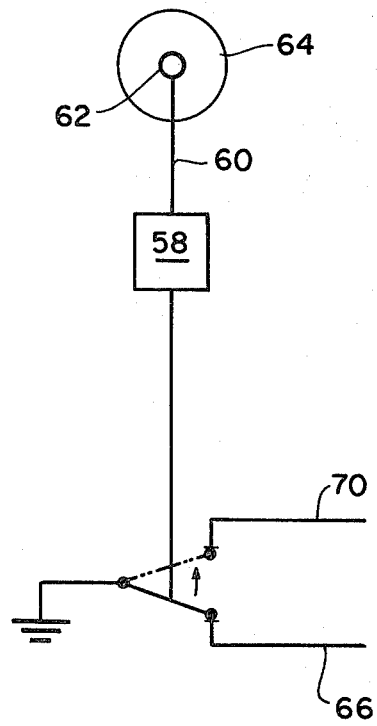
FIG. 4 illustrates further details of the aquastat control of FIG. 3.

As used as illustrated in FIG. 3, switch 58 will open the normally closed circuit 66 for a motor 68 and close the circuit 70 for a motor 72 whenever the circulating pump 30 or, more particularly, the motor 64 thereof, is operative, and the shaft 62 thereof is thus rotating. Thus, when the circulating pump is not operating, the normally closed circuit 66 for motor 68 induces operation of motor 68 and shaft rotation in a drive direction which, in turn, rotates the aquastat 26 in a corresponding direction (i.e. clockwise) providing a progressively lower temperature set point. This may occur until contact 74 abuts against limit switch 76 terminating the operation of motor 68 via circuit 78, or until the circulating pump ceases to operate and switch 58 takes over. As already noted, actuation of switch 58 results in operation of motor 72 and rotation of its shaft in a drive direction, which causes rotation of the aquastat 26 in a corresponding direction (i.e. counterclockwise) which produces a progressively increasing temperature set point. This can occur until contact 74 abuts against limit switch 80 terminating the operation of motor 72 via circuit 82.

The rotative movement of the motors 68 and 72 is transmitted to the aquastat 26 by a vertically movable rack 84 inter-meshing, as at the locations individually and collectively designated 86, with gears appropriately operatively associated to rotate in unison with said motors 68,72 and aquastat 26.

The objective is, as noted, to have the pump 30 operate almost all the time, which would signify an optimum low temperature setting in the aquastat 26 for the prevailing ambient weather conditions. Using the control as described and illustrated in FIGS. 3 and 4, this is readily achieved by having motor 72, which controls elevation of the temperature setting of the aquastat 26, operate at a selected slower rate than motor 68, which controls the descent or lowering of the aquastat temperature setting. In practice, if motor 68 is set to operate five times faster than motor 72, eventually in any given period of operation, pump 30 will be operational five-sixths of the time, and non-operational the remaining one-sixth of the time.

From the foregoing it should be readily appreciated that there has been described herein an improved control for a hot water heating system 10 which is more effectively responsive to changing ambient weather conditions. Although the improved control has been described primarily in connection with effectuating temperature reductions in the heat exchange medium 14 in response to favorable changes in ambient weather conditions, it will of course be understood that it is also effective in producing increases in the temperature of the heat exchange medium 14 in response to ambient weather conditions dictating such an upward change. The temperature increase, however, does not entail savings in fuel and is thus less significant from this point of view. Also, in the description it should of course be readily appreciated that the duration of supervision or monitoring of the circulating pump 30 need not be restricted to one-hour intervals, or to temperature changes of 10 degrees, but that the within improved control can have other operating parameters. The selection of these parameters is merely a question of calibrating the changes in ambient weather conditions to appropriate changes in the operating levels of the boiler to achieve whatever comfort levels in the zones the user wants to achieve. In other respects as well, it should be understood that a latitude of modification, change and substitution is intended in the foregoing disclosure, and that in some instances some features of the invention will be employed without a corresponding use of other features. Accordingly, it is appropriate that the appended claims be construed broadly and in a manner consistent with the spirit and scope of the invention herein.

What is claimed is:

1. An improvement to a hot water heating system for regulating the temperature of said hot water being used for heating purposes therein as a function of the ambient weather conditions, said improvement comprising plural delineated zones to be heated so located as to be affected by changing ambient weather conditions, a hot water circulating system operatively arrange in heating relation to said delineated zones, said hot water circulating system including at least one hot water pumping means for circulating said hot water and temperature-sensitive means in said delineated zones connected in controlling relation to said pumping means for providing operation of said pumping means for a selected duration of time in accordance with the temperature in said delineated zones as sensed by said temperature-sensitive means, a boiler operatively arranged in heating relation to said circulating hot water to maintain the temperature thereof at a selected temperature level, and control means operatively connected in controlling relation to both said pumping means and said boiler so as to lower the boiler operating temperature when detecting a significantly longer period of non-operation of said pumping means than a period of operation thereof over a given selected period of time, whereby nominal operation of said pumping means indicative of the use of hot water at an excessive temperature for given ambient weather conditions as sensed by said temperature-sensitive means in said delineated zones is modified by corresponding modification of said boiler operating temperature such that there is a reduction in said hot water temperature to that desired extent until there is a correspondingly greater extent of said pumping means duration of operation.

2. A control for a hot water heating system that is responsive to changing ambient weather conditions as claimed in claim 1, wherein said pumping means includes a pump and a motor connected in powering relation thereto, and said control means is connected in supervising relation to said pump.

3. A control for a hot water heating system that is responsive to changing ambient weather conditions as claimed in claim 2, wherein there is a pumping means for supplying fuel consumed in heat exchange to water prepared in said boiler for said hot water system, and said control means is connected in supervising relation to said pumping means.

* * * * *